(12) United States Patent
Prevost et al.

(10) Patent No.: US 9,341,231 B2
(45) Date of Patent: May 17, 2016

(54) OVERMOLDED WHEEL-BALANCING WEIGHT WITH WHEEL-SECURING CLIP

(71) Applicant: PLOMBCO INC., Salaberry-de-Valleyfield (CA)

(72) Inventors: Jean Prevost, Notre-Dame-de-L'ile-Perrot (CA); Didier Seguin, Salaberry-de-Valleyfield (CA); Martin Lussier, Lery (CA)

(73) Assignee: PLOMBCO INC., Salaberry-de-Valleyfield (CA)

( * ) Notice: Subject to any disclaimer, the term of this patent is extended or adjusted under 35 U.S.C. 154(b) by 0 days.

(21) Appl. No.: 13/799,261

(22) Filed: Mar. 13, 2013

(65) Prior Publication Data

US 2013/0187439 A1 Jul. 25, 2013

Related U.S. Application Data

(63) Continuation of application No. 13/415,107, filed on Mar. 8, 2012, now Pat. No. 8,807,663.

(60) Provisional application No. 61/450,374, filed on Mar. 8, 2011.

(51) Int. Cl.
*B60B 19/00* (2006.01)
*F16F 15/34* (2006.01)
(Continued)

(52) U.S. Cl.
CPC ......... *F16F 15/345* (2013.01); *B29C 45/14065* (2013.01); *B29C 45/14467* (2013.01); *F16F 15/324* (2013.01)

(58) Field of Classification Search
USPC ...................................................... 301/5.21
See application file for complete search history.

(56) References Cited

U.S. PATENT DOCUMENTS

| 4,068,898 A | 1/1978 | Hanson |
| 6,238,006 B1 | 5/2001 | Manojlovic |

(Continued)

FOREIGN PATENT DOCUMENTS

| EP | 1302695 | 4/2003 |
| EP | 1857707 | 11/2007 |

(Continued)

OTHER PUBLICATIONS

International Preliminary Report on Patentability, dated Sep. 10, 2013. Of Corresponding PCT Application No. PCT/CA2012/000210, filed on Mar. 8. 2012, filed by the applicant.

(Continued)

*Primary Examiner* — Jason Bellinger
(74) *Attorney, Agent, or Firm* — Mathieu Audet

(57) ABSTRACT

A polymer overmolded wheel-balancing weight adapted to be removably secured to a wheel to correct an unbalanced wheel to prevent undesired vibrations when the wheel is rotating, the polymer overmolded wheel-balancing weight with a wheel-securing clip sized and designed to be secured to a wheel, and a weight assembled to the wheel-securing clip and at least partially covered with overmolding polymer material that is sized and designed to abuts the wheel-securing clip on a wheel side at a first location thereof, and abuts the wheel-securing clip on a side opposed to the wheel side at a second location thereof, the first location being distinct from the second location. A kit of wheel-balancing weight and a wheel with an overmolded wheel-balancing weight are also encompassed by the present application.

20 Claims, 13 Drawing Sheets

(51) Int. Cl.
  *F16F 15/32* (2006.01)
  *B29C 45/14* (2006.01)

(56) References Cited

U.S. PATENT DOCUMENTS

| | | | |
|---|---|---|---|
| 6,364,422 B1 | 4/2002 | Sakaki |
| 6,488,341 B2 | 12/2002 | Maruyama |
| 6,698,845 B2 | 3/2004 | Corte |
| 6,729,694 B2 | 5/2004 | Maruyama |
| 6,948,781 B2 | 9/2005 | Sery |
| 7,055,914 B1 | 6/2006 | Jenkins |
| 7,093,907 B2 | 8/2006 | Jenkins |
| 7,216,938 B2 | 5/2007 | Phillips |
| 7,249,804 B2 | 7/2007 | Zank |
| 7,354,968 B2 | 4/2008 | Nishikawa |
| 7,566,101 B2 | 7/2009 | Jenkins |
| 7,841,669 B2 | 11/2010 | Zank |
| 7,883,156 B2 | 2/2011 | Pursley |
| 8,066,335 B2 | 11/2011 | Jenkins |
| 2004/0256909 A1 | 12/2004 | Sery |
| 2006/0119166 A1 | 6/2006 | Jenkins |
| 2006/0119167 A1 | 6/2006 | Jenkins |
| 2006/0138854 A1 | 6/2006 | LeMoal |
| 2007/0120414 A1 | 5/2007 | Jenkins |
| 2009/0230757 A1 | 9/2009 | Chancharoen |
| 2009/0278397 A1 | 11/2009 | Jenkins |
| 2011/0266862 A1 | 11/2011 | Halle |
| 2012/0228920 A1* | 9/2012 | Lussier et al. ............... 301/5.21 |
| 2012/0267941 A1 | 10/2012 | Everhard et al. |

FOREIGN PATENT DOCUMENTS

| | | |
|---|---|---|
| EP | 1927784 | 6/2008 |
| JP | 53045801 A | 4/1978 |
| JP | 58081803 A | 5/1983 |
| JP | S6061301 A | 4/1985 |
| JP | S6061302 A | 4/1985 |
| JP | 61033301 A | 2/1986 |
| JP | 63291702 A | 11/1988 |
| JP | 3272347 A | 12/1991 |
| JP | Y0002596562 Y2 | 4/1994 |
| JP | U1994063957 | 9/1994 |
| JP | Y1994049951 | 12/1994 |
| JP | U1995008646 | 2/1995 |
| JP | 8061433 A | 3/1996 |
| JP | U0003046046 | 11/1997 |
| JP | 10026187 A | 1/1998 |
| JP | U0003051017 | 5/1998 |
| JP | 10176732 A | 6/1998 |
| JP | 2933098 B2 | 8/1998 |
| JP | 10220532 A | 8/1998 |
| JP | U0003053876 | 8/1998 |
| JP | 10331918 A | 12/1998 |
| JP | 11013834 A | 1/1999 |
| JP | U0003057630 | 3/1999 |
| JP | 11166595 A | 6/1999 |
| JP | 11201235 A | 7/1999 |
| JP | 11210835 A | 8/1999 |
| JP | 11210836 A | 8/1999 |
| JP | 11257435 A | 9/1999 |
| JP | 11280845 A | 10/1999 |
| JP | 11294541 A | 10/1999 |
| JP | U0003066654 | 12/1999 |
| JP | 2000035087 A | 2/2000 |
| JP | 2000046120 A | 2/2000 |
| JP | 3065526 B2 | 7/2000 |
| JP | 2000314453 A | 11/2000 |
| JP | 2001012554 A | 1/2001 |
| JP | 2001041290 A | 2/2001 |
| JP | 2001132797 A | 5/2001 |
| JP | 2001221290 A | 8/2001 |
| JP | 2001227590 A | 8/2001 |
| JP | 2001234980 A | 8/2001 |
| JP | 2002054686 A | 2/2002 |
| JP | 2002061713 A | 2/2002 |
| JP | 2002061714 A | 2/2002 |
| JP | 2002098194 | 4/2002 |
| JP | 3333914 B2 | 10/2002 |
| JP | 2003113900 A | 4/2003 |
| JP | 3503007 B2 | 3/2004 |
| JP | 2004084715 A | 3/2004 |
| JP | 2004092685 A | 3/2004 |
| JP | 3569663 B2 | 9/2004 |
| JP | 3663066 B2 | 6/2005 |
| JP | U0003112148 | 6/2005 |
| JP | 3677912 B2 | 8/2005 |
| JP | 2005291262 A | 10/2005 |
| JP | 3772942 B2 | 5/2006 |
| JP | 2006131027 A | 5/2006 |
| JP | 3783134 B2 | 6/2006 |
| JP | 2006153079 A | 6/2006 |
| JP | 3847974 B2 | 11/2006 |
| JP | 3893478 B2 | 3/2007 |
| JP | 3897905 B2 | 3/2007 |
| JP | 3918012 B1 | 5/2007 |
| JP | 3922666 B2 | 5/2007 |
| JP | 2007162860 A | 6/2007 |
| JP | 2008057649 A | 3/2008 |
| JP | 4149900 B2 | 9/2008 |
| JP | U0003160651 | 6/2010 |
| JP | 2011052779 A | 3/2011 |
| JP | 2011094735 A | 5/2011 |
| WO | WO 00/61391 | 10/2000 |
| WO | WO02/086347 | 10/2002 |
| WO | WO2004/025139 | 3/2004 |
| WO | WO2007/114690 | 10/2007 |
| WO | WO2008/107667 | 9/2008 |
| WO | WO2011128654 | 10/2011 |

OTHER PUBLICATIONS

International Search Report, dated Jul. 3, 2012, of Corresponding PCT application No. PCT/CA2012/000210, filed Mar. 8, 2012, filed by the applicant.

* cited by examiner

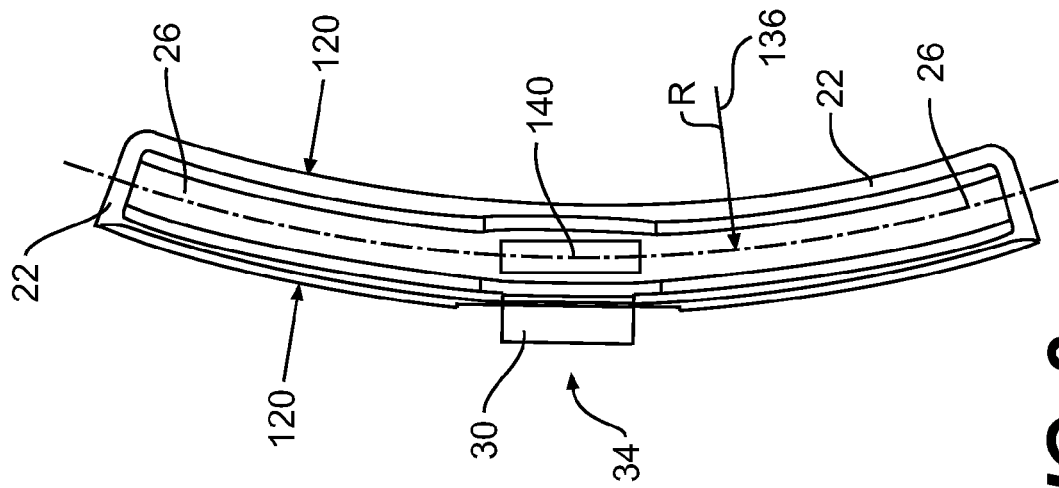
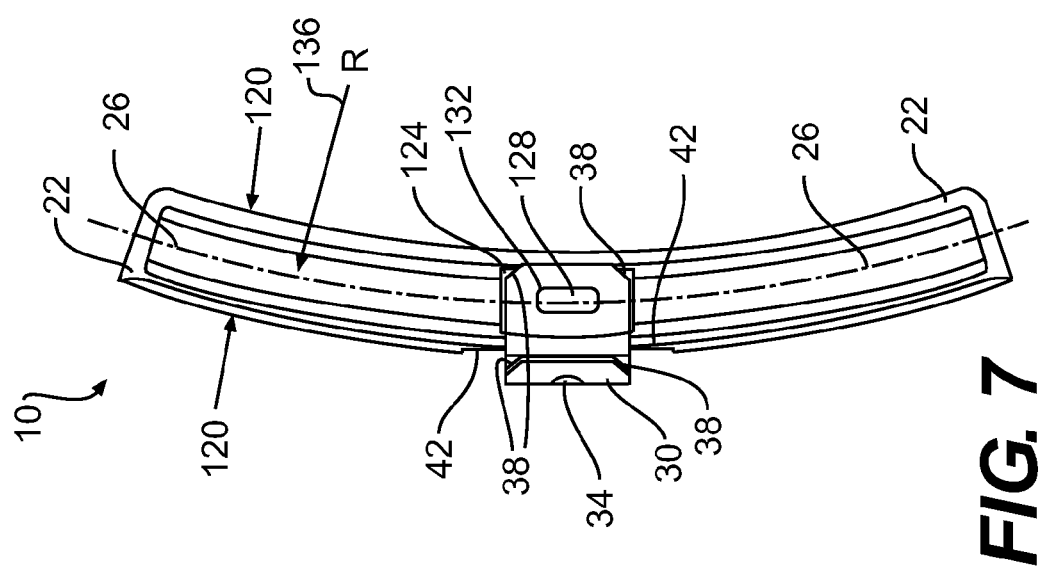

OVERMOLDED WHEEL-BALANCING WEIGHT WITH WHEEL-SECURING CLIP

CROSS-REFERENCE

The present application is a continuation of, and claims priority under 35 U.S.C. 120 to, U.S. patent application Ser. No. 13/415,107, filed Mar. 8, 2012, entitled OVERMOLDED WHEEL-BALANCING WEIGHT, now U.S. Pat. No. 8,807, 663 which is incorporated herein by reference, and which is a nonprovisional of, and claims priority under 35 U.S.C. 119(e) to, U.S. provisional patent application No. 61/450,374, filed Mar. 8, 2011, entitled PLASTIC OVERMOLDED WHEEL-BALANCING WEIGHT, which is incorporated herein by reference in their entireties. Any publication of and any patent issuing from the foregoing U.S. patent applications is hereby incorporated herein by reference, including U.S. patent application publication no. 2012/0228920. Furthermore, the disclosure of the priority provisional application is contained in the Appendix hereto, which is incorporated herein by reference.

FIELD OF THE INVENTION

This invention relates to a method for covering and protecting a steel wheel-balancing weight. More precisely, the present invention relates to polymer-covered wheel-balancing weights adapted to cooperate with wheels.

BACKGROUND OF THE INVENTION

Wheel-balancing weights (or wheel weights, wheel balance weights) are commonly used on wheeled vehicles to improve the static and dynamic balancing of the wheel assembly. To balance the wheels, each wheel is rotated with a wheel-balancing apparatus that analyses and detects uneven weight distribution thereof that could generate significant vibrations when the wheels rotate at various rotating speeds. This undesirable wheel vibration would be transmitted to the entire vehicle, if not corrected. Corrective wheel-balancing weights, when required, are secured on the circumference of the wheel on both the interior and the exterior sides of the wheel. The addition of required wheel-balancing weights corrects the polar weight distribution of the wheel assembly and balances the wheel that will rotate without inducing undesirable vibrations.

Legacy wheel-balancing weights are made in lead. Nowadays, environmental consciousness and regulations suggest avoiding using lead that could have an undesirable effect on our ecosystems. Replacement of lead by steel is therefore a desirable direction.

However, the use of steel has some drawbacks. Steel is subject to corrosion and should be protected thereagainst. Steel balancing weights can also damage the wheel it is installed on. Steel is also harder and more difficult to shape to obtain a close and precise fit between the wheel-balancing weight and the wheel it is secured thereto. Additionally, the aesthetic of steel wheel balancing weights is questionable and it might be desirable to add a more visually attractive cover.

Covering the wheel-balancing weights with plastic could be an advantageous alternative. However, molding plastic over the wheel-balancing weight requires a complex and expansive tooling. Issues can arise when overmolding a steel wheel balancing weight. For instance, the overmolding plastic can retract and leave a gap with the steel weight where water and dirt can enter. Some overmolding materials might difficultly manage frequent changes in temperature and react poorly to impacts thereon. The geometry of the plastic overmolding might also require complex and expansive molds and handling.

The junction between the overmolding material and the wheel-securing clip is a sensitive portion of the overmolded wheel-balancing weight because the overmolding material boundary merges with the wheel-securing clip generally made of a different material.

Therefore, there exists a need in the art for an improved method, system and apparatus for covering wheel-balancing weights with plastic, polymer or another material. There is a need in the art for such a method, system and apparatus for covering wheel-balancing weights with overmolding polymer or another material that can be easily installed, economically manufactured and operated. And there is a very perceptible need for an improved fit between a polymer-covered wheel-balancing weight and a method of manufacturing same over the existing art.

SUMMARY OF THE INVENTION

It is one aspect of the present invention to alleviate one or more of the drawbacks of the background art by addressing one or more of the existing needs in the art.

Accordingly, at least one embodiment of the invention provides an undercutless overmolded wheel-balancing weight, a mold for producing same and a method of overmolding a steel wheel-balancing weight adapted to prevent injecting overmolding material in the region of the overhanging wheel-securing clip.

At least one embodiment of the invention provides a method of overmolding a metallic wheel-balancing weight using a mold that prevents polymer injection around the wheel-securing clip that would create an undercut interfering with the ejection of the overmolded wheel-balancing weight from the mold and require a more complex mold adapted to manage overhanging portions.

At least one embodiment of the invention provides a method and an apparatus for overmolding a steel wheel-balancing weight with a polymer wherein the distribution of polymer around the wheel-balancing weight allows extraction of the overmolded wheel-balancing weight by simply opening the apparatus in two.

At least one embodiment of the invention provides a method and a mold for overmolding a wheel-balancing weight with a polymer wherein the distribution of polymer around the wheel-balancing weight allows extraction of the overmolded wheel-balancing weight by opening the mold in two along the longitudinal plan of the wheel-balancing weight.

At least one embodiment of the invention provides ribs disposed on the longitudinal sides of the overmolded wheel-balancing weight that help maintains the wheel-balancing weight on one halve of the mold to facilitate extraction of the overmolded wheel-balancing weight when opening the mold in two halves along the longitudinal plan of the wheel-balancing weight.

At least one embodiment of the invention provides a method and an apparatus for overmolding a wheel-balancing weight with a polymer wherein the distribution of polymer around the clip of the wheel-balancing weight allows extraction of the overmolded wheel-balancing weight by opening the mold in two halves along the longitudinal plan of the wheel-balancing weight.

At least one embodiment of the invention provides a method and an apparatus for overmolding a wheel-balancing weight with a polymer wherein the clip of the wheel-balancing weight substantially follows the shape of the overmolding polymer.

At least one embodiment of the invention provides a method and an apparatus for overmolding a wheel-balancing weight with a polymer wherein the clip of the wheel-balancing weight substantially angularly extends from the overmolded polymer to offer a tight polymer-clip junction.

At least one embodiment of the invention provides a method and an apparatus for overmolding a wheel-balancing weight with a polymer-free wheel-balancing weight clip area.

At least one embodiment of the invention provides a method and an apparatus for overmolding a wheel-balancing weight while preventing polymer to be injected around the clip that would prevent removal from the mold by opening the mold in two.

At least one embodiment of the invention provides a method and an apparatus for overmolding a wheel-balancing weight that uses the wheel-securing clip of the wheel-balancing weight for restricting the injection of polymer around the wheel-securing clip.

At least one embodiment of the invention provides a method and an apparatus for overmolding a wheel-balancing weight that reduces the thickness of the overmolding material in the area surrounding the wheel-securing clip of the wheel-balancing weight.

At least one embodiment of the invention provides a polymer overmolded wheel-balancing weight that has no undercuts created by the overhanging wheel-securing clip assembled thereto.

At least one embodiment of the invention provides a polymer overmolded wheel-balancing weight having no polymer within the cavity defined by the wheel-securing clip and a method of manufacturing same.

At least one embodiment of the invention provides a polymer overmolded wheel-balancing weight wherein the overmolding material follows the shape of the wheel-securing clip of the wheel-balancing weight that substantially define the shape of at least a portion of the overmolding polymer.

At least one embodiment of the invention provides a polymer overmolded wheel-balancing weight wherein an edge of the overmolding material radially meet the wheel securing clip of the wheel-balancing weight.

At least one embodiment of the invention provides a wheel-securing clip configured to secure a wheel-balancing weight to a wheel, wherein the wheel-securing clip includes a raised portion adapted to improve the junction between an edge of the overmolding material and the wheel-securing clip.

At least one embodiment of the invention provides a polymer overmolded wheel-balancing weight wherein the wheel-securing clip of the wheel-balancing weight substantially contacts the injection mold and forms an injection boundary portion of the injection mold.

At least one embodiment of the invention provides a polymer overmolded wheel-balancing weight having a shape adapted to substantially match the circumference of the wheel secured thereto.

At least one embodiment of the invention provides an overmolded wheel-balancing weight wherein the weight is secured to the wheel-securing clip on the side opposed to the wheel-side when the overmolded wheel-balancing weight is secured to a wheel.

At least one embodiment of the invention provides an overmolded wheel-balancing weight that connects the weight to the wheel-securing clip via a protrusion formed in the weight; the protrusion being adapted to be compressed and/or riveted to secure the wheel-securing clip therewith.

At least one embodiment of the invention provides a wheel-securing clip for securing an overmolded wheel-balancing weight to a wheel that includes a recessed weight-securing portion sized and designed to receive therein material from a compressed protrusion protruding from the weight.

At least one embodiment of the invention provides a method of manufacturing an overmolded wheel-balancing weight, wherein the wheel-securing clip is used to locate the wheel-balancing weight in the mold; the wheel-balancing weight being preferably secured on the fixed portion of the mold.

At least one embodiment of the invention provides a method of manufacturing an overmolded wheel-balancing weight, wherein the wheel-balancing weight is secured in the mold with a clip-securing member adapted to pull the wheel-balancing weight with a moveable side of the mold.

At least one embodiment of the invention provides a method of manufacturing an overmolded wheel-balancing weight, wherein the overmolding material and/or the wheel-balancing weight is preheated to prevent expedite solidification of the injected overmolding material.

At least one embodiment of the invention provides a method of manufacturing an overmolded wheel-balancing weight, wherein the overmolding material is injected nearby the wheel-securing clip to equally distribute the overmolding material in the injection cavity of the injection mold.

At least one embodiment of the invention provides a colored polymer overmolded wheel-balancing weight adapted to substantially match the color of the wheel it is secured to.

At least one embodiment of the invention provides a kit of colored overmolded wheel-balancing weights wherein colors are adapted to distinguish wheel-balancing weights different having different weights.

At least one embodiment of the invention provides an injection mold including at least one retractable stem therein adapted to locate the weight in the injection mold during the injection of the overmolding material in the injection chamber, the at least one retractable stem being further adapted to be retractable during the injection process to allow complete overmolding of the weight, the at least one retractable stem also being adapted to be extended to locate and eject the overmolded wheel-balancing weight from the injection mold.

At least one embodiment of the invention provides a polymer (or plastic) weight (e.g. steel less weight) supported by a wheel-securing clip, the polymer weight being molded with the wheel-securing weight, the polymer weight being desirable for lightweight wheel-balancing masses that do not require a metallic weight.

At least one embodiment of the invention provides an overmolded wheel-balancing weight comprising a wheel-securing clip adapted to be secured to a wheel, a weight assembled to the wheel-securing clip and overmolding material adapted to at least partially cover the weight to protect the weight, wherein at least a portion of the wheel-securing clip is an overmolding material boundary.

At least one embodiment of the invention provides a method of manufacturing an overmolded wheel-balancing weight, the method comprising opening an injection cavity of an injection mold; securing the wheel-securing clip to a clip-supporting member in the mold to locate a weight in the injection cavity; closing the injection mold with a weight in the injection cavity; injecting overmolding material in the injection cavity to overmold at least a portion of the weight; opening the mold; and extracting the overmolded wheel-balancing weight from the mold.

At least one embodiment of the invention provides a plastic wheel-balancing weight adapted to be removably secured to a wheel to correct an unbalanced wheel to prevent undesired vibrations when the wheel is rotating, the plastic wheel-balancing weight comprising a wheel-securing clip sized and designed to be resiliently secured to a wheel; and a steel weight assembled to the wheel-securing clip and at least partially covered with plastic, at least a portion of the plastic being shaped by the wheel-securing clip.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure:

FIG. 7 is a rear sectional elevational view of an overmolded wheel-balancing weight in accordance with at least one embodiment of the invention;

FIG. 8 is a front sectional elevational view of an overmolded wheel-balancing weight in accordance with at least one embodiment of the invention;

DETAILED DESCRIPTION OF PREFERRED EMBODIMENTS

Figure 1:
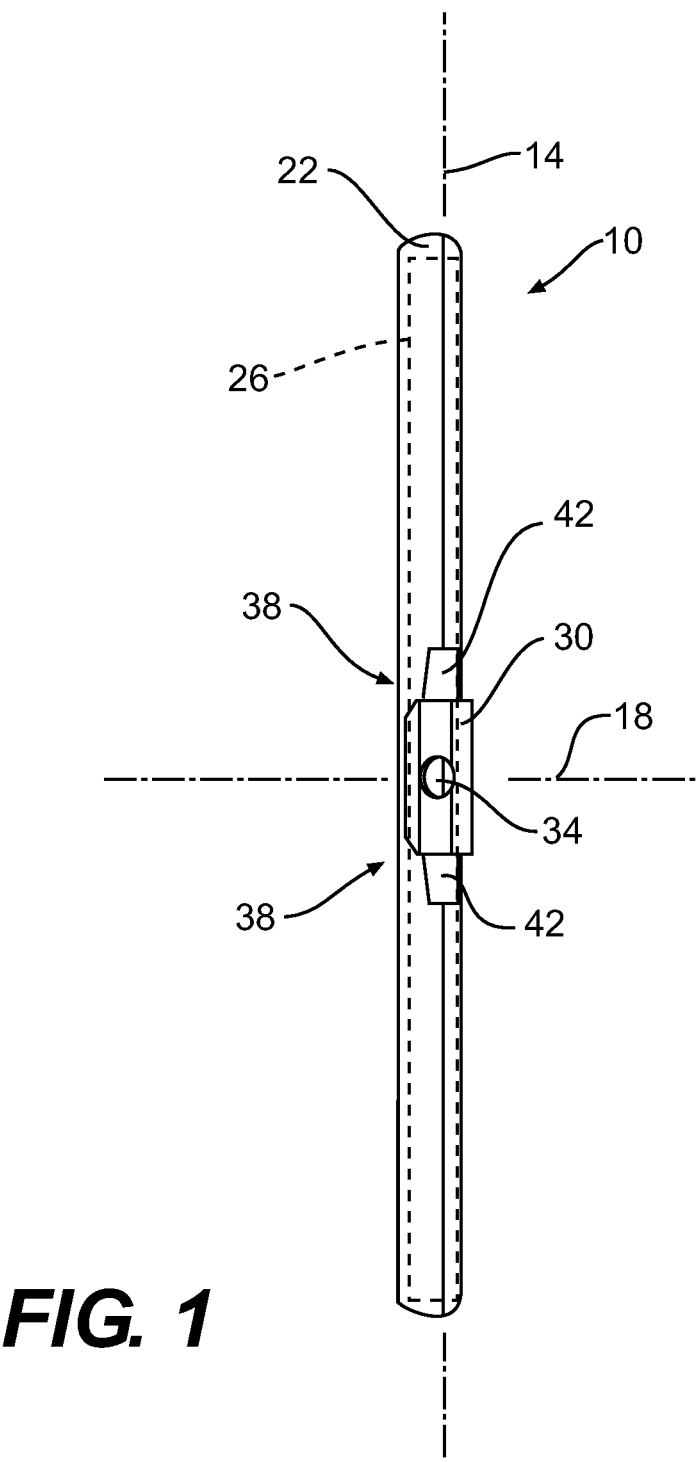
FIG. 1 is a top plan view of an overmolded wheel-balancing weight in accordance with at least one embodiment of the invention.

Embodiments of the present invention are described bellow with reference to the appended Figures. An exemplary overmolded metallic wheel-balancing weight 10 is illustrated in FIG. 1. The wheel-balancing weight 10 defines, for the purpose of the following description, at least two illustrative plans thereof. A longitudinal plan 14 disposed along the longitudinal direction of the wheel-balancing weight 10 and a transversal plan 18 orthogonally intersecting the longitudinal direction of the wheel-balancing weight 10. It is understood that the present invention can be completely or partially applied to a variety of wheel-balancing weights 10 having various sizes and shapes.

The illustrative wheel-balancing weight 10 depicted in FIG. 1 is overmolded with an polymer overmolding material such as polyethylene and polypropylene. The overmolding material 22 overmolds and protects the steel weight 26 therein against, inter alia, water, corrosion, dust and other debris encountered on the road. The overmolding material also servers to protect the wheel form the wheel-balancing weight 10 during installation on the wheel and when the wheel-balancing weight 10 is installed on the wheel under normal road use. Additionally, the overmolding material is used to improve the aesthetic appearance of the wheel-balancing weight and be used to visually differentiate different weights.

A wheel-securing clip 30 is secured to the overmolded steel weight 26 to removably secure the wheel-balancing weight 10 to the periphery of a wheel (not shown). An optional hole 34 is performed in the wheel-securing clip 30 in some embodiments to adjust the clipping force of the wheel-securing clip 30 on the wheel, provide a grip to remove the wheel-balancing weight 10 from the wheel and/or reduce the weight of the wheel-balancing weight 10. The hole 34 is also used in some embodiments of the manufacturing process to handle the wheel-balancing weight 10 as it is going to be further explained below. Radiuses 38, or chamfers 38, are provided on ends corners of the wheel-securing clip 30 to prevent creating stress concentrators in the overmolded polymer that could result in rupturing the overmolded polymer and create cracks therein. The radiuses 38, or chamfers 38 also help prevent damaging the wheel with sharp edges if used without overmolding. Embodiments of the present invention includes a reduced thickness portion 42 of the overmolded material 22, in the neighborhood of the wheel-securing clip 30, to prevent interferences between the overmolding material 22 and the wheel-securing clip 30. The portion 42 thus facilitate proper connection between the wheel-securing clip 30 and the wheel and prevents any overmolding material 22 to be injected within the cavity defined by the wheel-securing clip 30 that would render harder the ejection of the wheel-balancing weight 10 from the mold. We will return later to the manufacturing aspects of the wheel-balancing weight 10 after some details concerning process embodiments for manufacturing the wheel-balancing weight 10.

Figure 2:
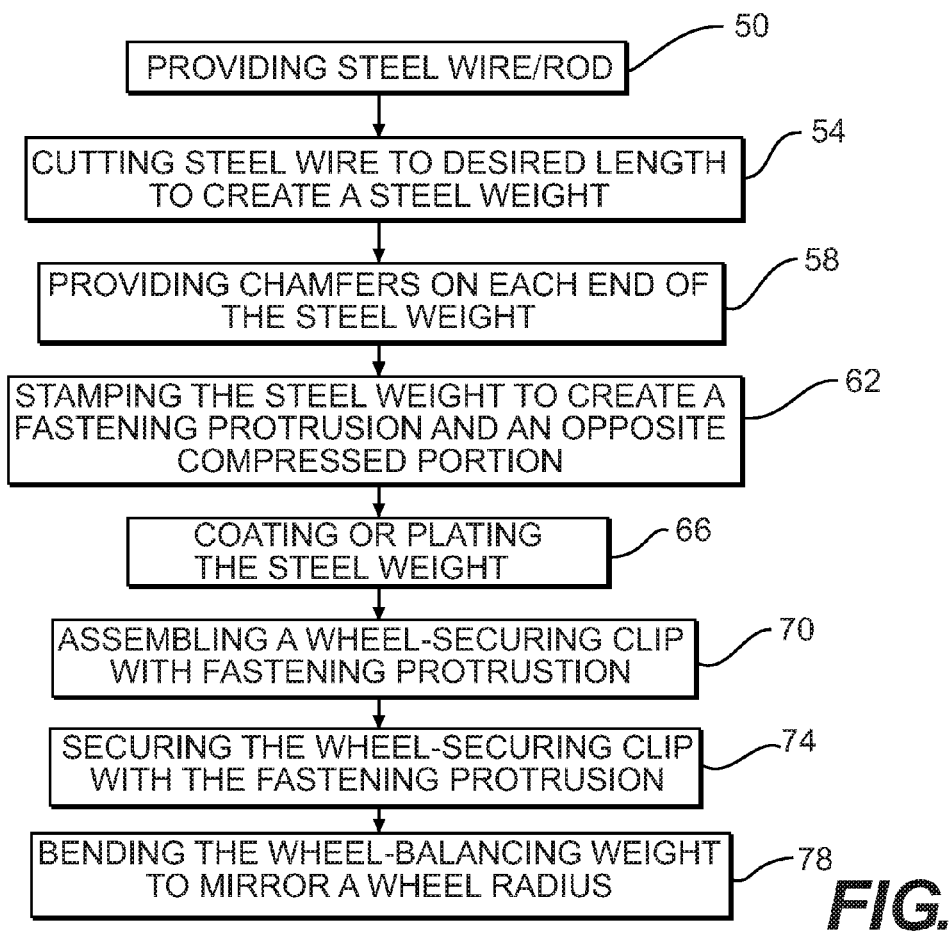
FIG. 2 is a flow chart illustrating a series of steps to produce an overmolded wheel-balancing weight in accordance with at least one embodiment of the invention.

FIG. 2 illustrates an exemplary series of manufacturing steps adapted to produce a wheel-balancing weight 10. An unmolded steel weight 26 is provided from raw material, preferably in the shape of a steel rod 50, a steel wire 50, or similar monolithic steel weight 26 adapted to improve wheel balancing. The raw steel rod is cut 54 and the length of the cut portion of steel rod 50 is determined by the desired weight of the wheel-balancing weight 10. The total mass of the wheel-balancing weight 10 is equal to the added weight of the wheel-securing clip 30, the steel weight 26 and the overmolding material 22. The longer the portion of cut steel rod 50 is, the heavier the wheel-balancing weight 10 is going to be. Chamfers or radiuses are optionally performed 58 on each end of the steel weight 26 to remove undesirable sharp edges. The steel weight 26 is then stamped 62 to create therein a fastening protrusion 128 and an optional opposed compressed portion 140 that will be described in details below. The steel weight 26 is optionally plated after it has been chamfered and/or bent to improve, inter alia, its corrosion resistance 66. A wheel-securing clip 30 is assembled 70 with the corresponding fastening protrusion and the wheel-securing clip 30 is secured to the steel weight 26 by compressing and deforming the fastening protrusion 74 to secure the wheel-securing clip 30 to the steel weight 26. The assembled wheel-balancing weight 10 is then bent 78 to match the radius of the wheel it is going to be assembled to. The steps above are for illustrative purposes and can be reordered without departing from the scope of the present application.

Figure 3:
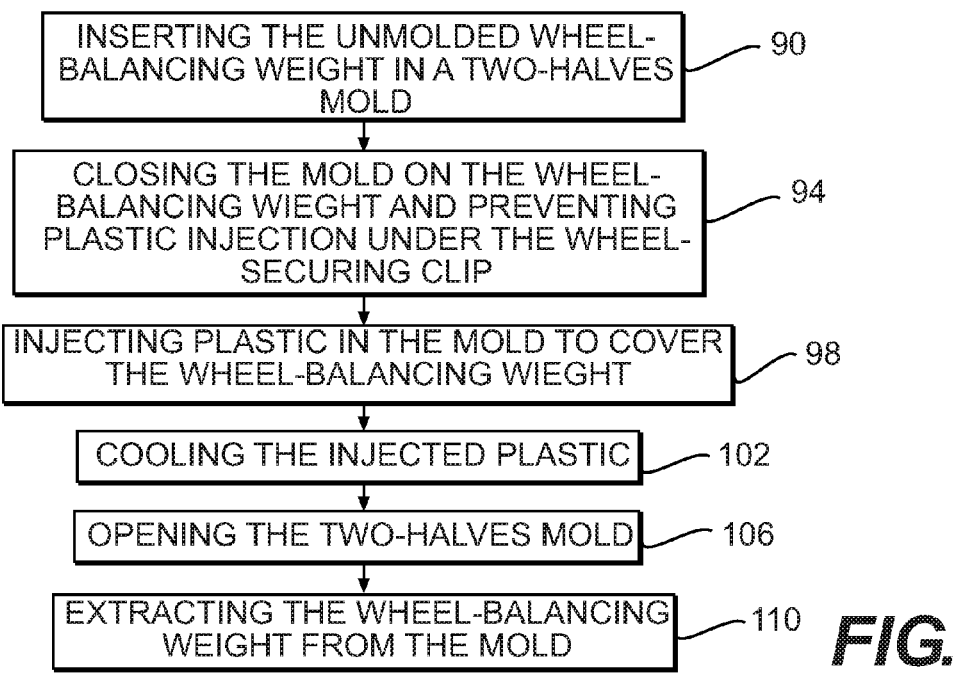
FIG. 3 is a flow chart illustrating a series of steps to produce an overmolded wheel-balancing weight in accordance with at least one embodiment of the invention.

FIG. 3 illustrates another exemplary series of steps for manufacturing polymer-overmolded wheel-balancing weights 10 in accordance with embodiments of the invention. An unmolded wheel-securing clip 30 and steel weight 26 assembly is inserted in an injection mold 90. The mold is closed 94 to define a volume therein (e.g. injection chamber) for injecting a polymer, a resin, a thermoset plastic, a plastic or another suitable overmolding material around the unmolded wheel-securing clip 30 and steel weight 26 assembly. The connection between the wheel-securing clip 30 and the mold could be used to locate the steel weight 26 inside the mold. Polymers, such as polypropylene and polyethylene, could be used in the process. A precise fit is provided between the mold and the wheel-securing clip 30 to prevent any injection of plastic at undesired locations around the wheel-securing clip 30. The mold interface with the wheel-securing clip 30 is designed in embodiments of the invention to prevent any undercuts that would interfere with the ejection of the molded wheel-balancing weight 10 with a mold having two halves and a single longitudinal parting line. Polymer is injected 98 in the mold and the injected plastic is cooled 102 prior to opening the mold 106 and extracting 110 the overmolded wheel-balancing weight from the mold.

Figure 6:
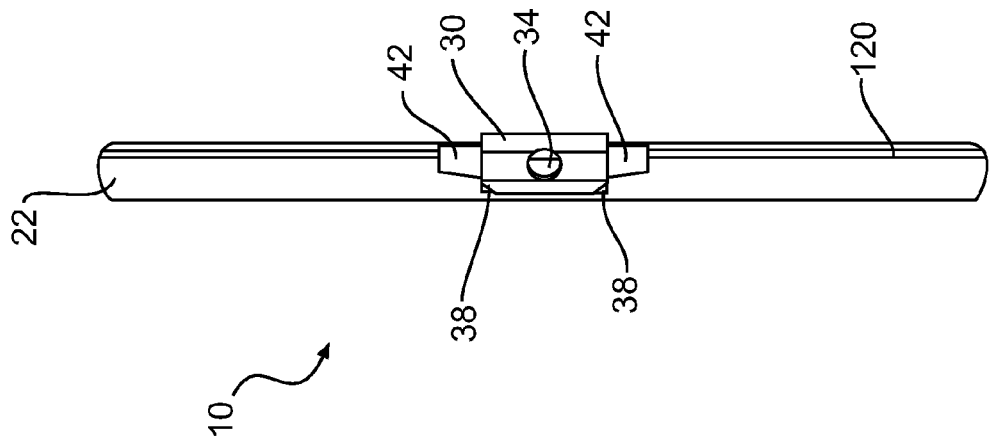
FIG. 6 is a top plan view of an overmolded wheel-balancing weight in accordance with at least one embodiment of the invention.
Figure 5:
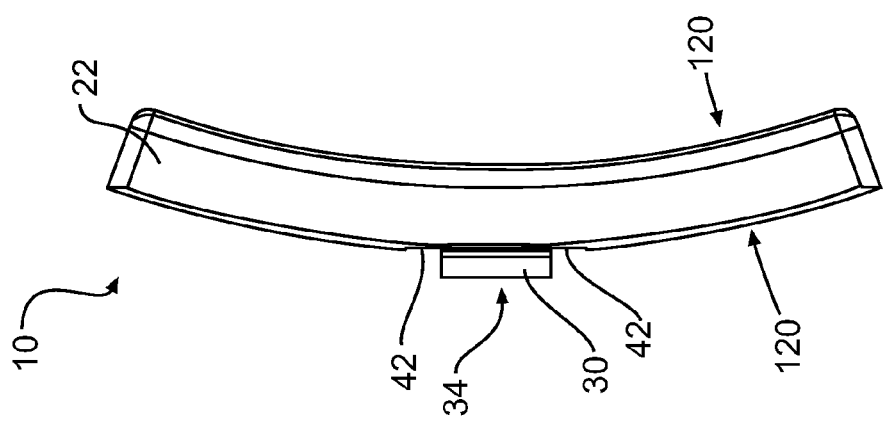
FIG. 5 is a front elevational view of an overmolded wheel-balancing weight in accordance with at least one embodiment of the invention.
Figure 4:
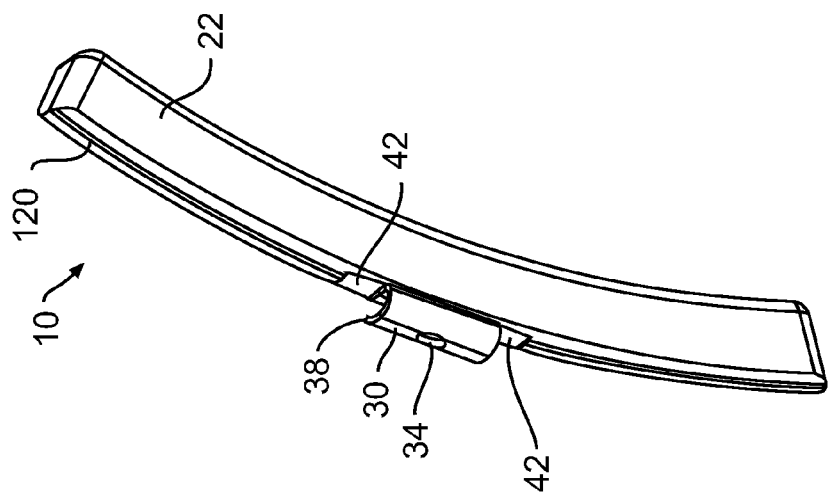
FIG. 4 is an almost front elevational view of an overmolded wheel-balancing weight in accordance with at least one embodiment of the invention.

FIG. 4 through FIG. 10 refer to an exemplary embodiment of the invention. More precisely FIG. 4 through FIG. 6 depict the exterior of the wheel-balancing weight 10 where it is possible to see the polymer overmolding 22, the parting line 120, and the wheel-securing clip 30 extending outside the polymer overmolding 22.

FIG. 7 and FIG. 8 respectively illustrate longitudinal sectional views of the wheel-balancing weight 10 where one can appreciate a compressed portion 124 in the steel weight 26 from which extends the fastening protrusion 128. The fastening protrusion 128 is assembled with a corresponding opening 132 located in the clip 30. The illustrated assembly secures the wheel-securing clip 30 with the steel weight 26 by bending or compressing the fastening protrusion 128 when the wheel-securing clip 30 is assembled thereto. It can also be appreciated from these Figures that the steel weight 26 of the wheel-balancing weight 10 is curved along a radius 136. The optional opposite compressed portion 140 can be appreciated on the other side of the steel weight 26 illustrated in FIG. 8. The opposite compressed portion 140 helps to ensure proper pressure is put on the steel weight 26 at the stamping phase to create the fastening protrusion and also increases the strength of the steel weight 26 by locally hardening the material. The material of the protrusion 128 is adapted to be housed by a recessed portion 188 of the wheel-securing clip 30 that will be detailed later below.

Figure 9:
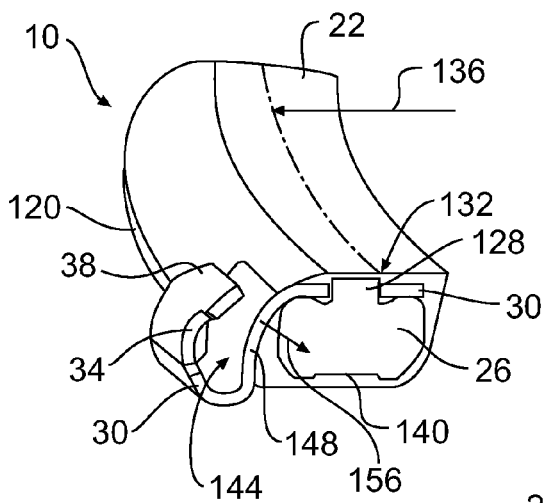
FIG. 9 is a transversal isometric sectional elevational view of an overmolded wheel-balancing weight in accordance with at least one embodiment of the invention.
Figure 10:
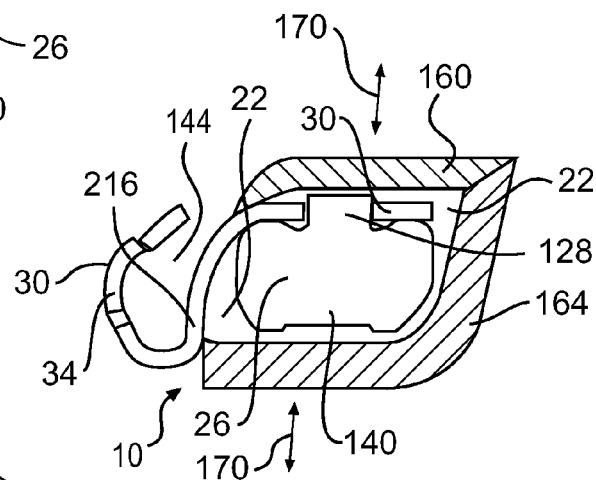
FIG. 10 is a transversal sectional elevational view of an overmolded wheel-balancing weight in accordance with at least one embodiment of the invention.

Turning now to FIG. 9 where the fastening protrusion 128 assembly with the corresponding opening 132 located in the clip 30 is illustrated with more details. From this figure it can be appreciated that the mold (visible schematically illustrated in FIG. 10) design circumscribes the clip 30 and that results in no plastic injection within the clip 30 cavity 144. Further, the shape of the clip 30 defines a radius 148 that retains the injected plastic on its proximal side 156 when the plastic is injected and abuts the plastic portion of the wheel-balancing weight 10 when the wheel-balancing weight 10 is overmolded. This layout allows overmolding the fastening protrusion 128 and the assembly with the clip 30 with plastic thus improving its corrosion resistance while reducing the risk of damaging the wheel when the wheel-balancing weight 10 is assembled to the wheel. FIG. 10 illustrates an exemplary mold having two halves 160, 164 circumventing the wheel-securing clip 30 while defining a closed volume around the steel weight 26 to receive injected plastic therein. It can be appreciated that the shape of the mold's halves 160, 164 is adapted to use the wheel-securing clip 30 as a mold boundary and thus prevent plastic to be injected too far within the cavity defined by the clip 30. This is one way to ensure there is no undercut in the molding that would prevent extraction of the molded part 10 from a mold having two halves 160, 164 and opening in the longitudinal plan 14 of the wheel-balancing weight 10. In an alternate embodiment, the clip 30 can be completely free of plastic. Plastic is injected all around the clip 30 and even leaves the region of the clip that is connected with steel weight 26 free of plastic. Conversely, it could be advantageous to cover the connecting region between the clip 30 and the steel weight 26 with plastic to further prevent corrosion.

Figure 11:
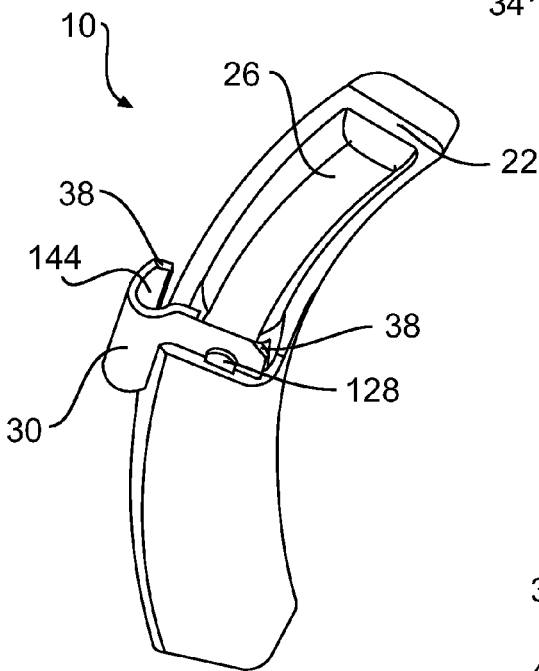
FIG. 11 is an isometric view of an overmolded wheel-balancing weight in accordance with at least one embodiment of the invention.
Figure 12:
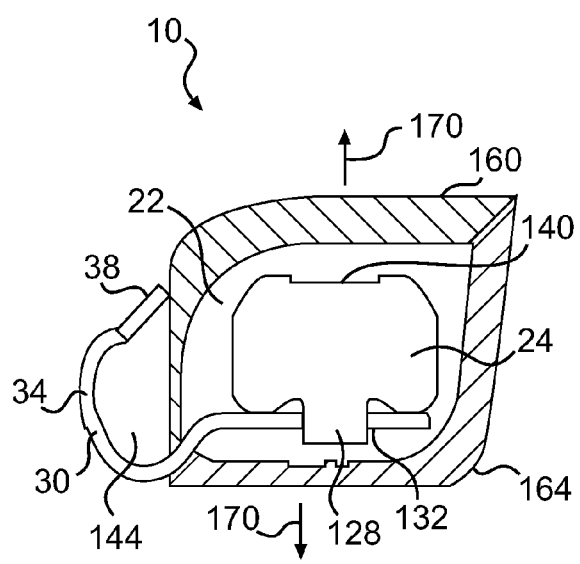
FIG. 12 is a transversal sectional view of an overmolded wheel-balancing weight in accordance with at least one embodiment of the invention.

Moving now to FIG. 11 and FIG. 10 illustrating another embodiment of the invention. One can appreciate from FIG. 11 that the clip 30 has a different radius 148 causing the clip 30 to protrude almost perpendicular from the plastic molding 22. As best seen in FIG. 10, the present assembly allows sufficient distance 152 between the clip 30 and the polymer overmolding 22 to insert therein a portion of the mold adapted to mate with the clip 30 and prevent plastic injection around the clip 30 that would prevent a two halves 160, 164 mold to be opened in the longitudinal plane 14 and the wheel-balancing weight 10 to be easily extracted from the mold. In the present situation, a schematic two-halves 160, 164 mold with a single longitudinal opening therein has been drafted showing that the wheel-balancing weight 10 can be ejected from the mold that opens in two according to arrows 170.

Figure 13:
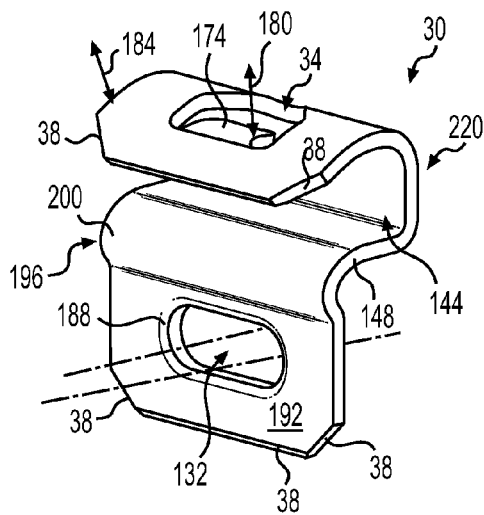
FIG. 13 is an isometric view of a wheel-securing clip in accordance with at least one embodiment of the invention.

FIG. 13 illustrates a wheel-securing clip 30 equipped with a barb 174 adapted to further secure the wheel-securing clip 30 to a wheel by providing additional gripping to the wheel. The barb 174 of the present embodiment provides a second spring clamping 180 for gripping the wheel in addition to the first spring clamping 184 provided by the main body of the wheel-securing clip 30. The shape of the wheel-securing clip 30 is adapted to engage the side of a wheel and is also adapted to be secured to the steel weight 26. The interface between the wheel-securing clip 30 and the steel weight 26 has generally been described above. The wheel-securing clip 30 illustrated in FIG. 13 is provided with a recessed portion 188 sized and designed to receive therein material from the compressed fastening protrusion 128 (not illustrated in FIG. 13) engaging the opening 132 in the wheel-securing clip 30. The opening 132 can be round or have a different shape adapted to prevent relative rotation of the two parts. The recessed portion 188 would preferably be deep enough to receive therein the material from the compressed fastening protrusion 128 so that it does not extend above the surrounding surface 192. This helps reduce the required thickness of overmolding material 22 (not illustrated on FIG. 13) over the "riveted" assembly of the wheel-securing clip 30 and the steel weight 26.

Figure 14:
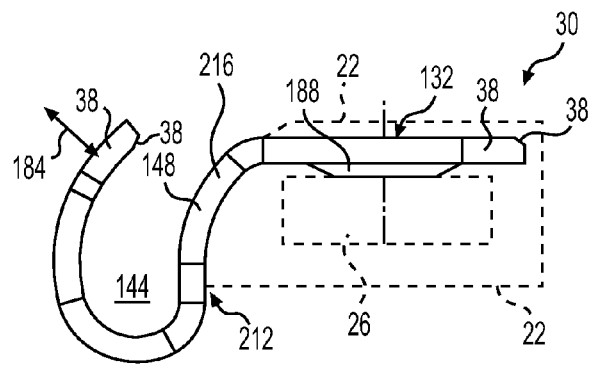
FIG. 14 is a transversal sectional elevational view of a wheel-securing clip in accordance with at least one embodiment of the invention.
Figure 15:
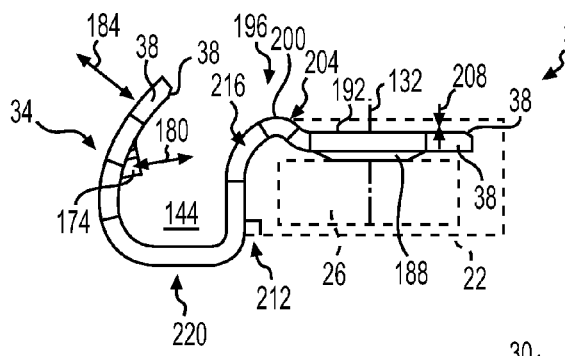
FIG. 15 is a transversal sectional elevational view of a wheel-securing clip in accordance with at least one embodiment of the invention.
Figure 16:
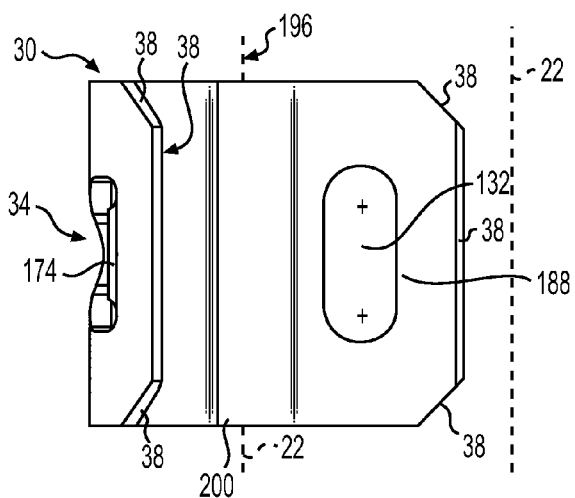
FIG. 16 is left side elevational view of a wheel-securing clip in accordance with at least one embodiment of the invention.
Figure 17:
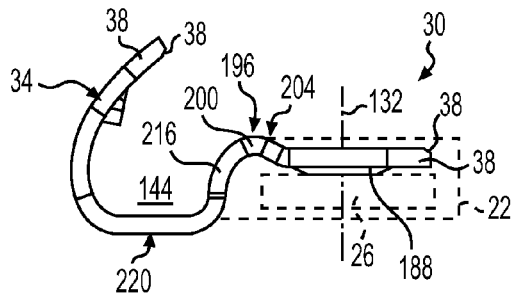
FIG. 17 is a transversal sectional elevational view of a wheel-securing clip in accordance with at least one embodiment of the invention.
Figure 18:
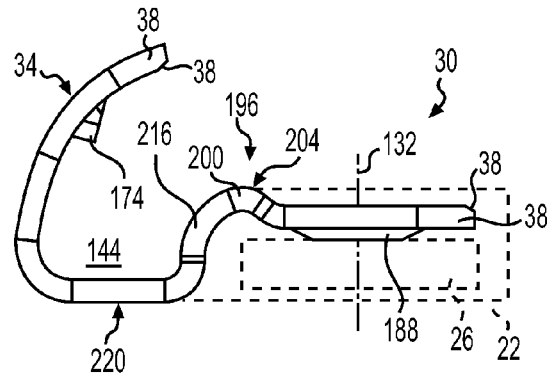
FIG. 18 is a transversal sectional elevational view of a wheel-securing clip in accordance with at least one embodiment of the invention.

Another aspect of the wheel-securing clip 30 illustrated in FIG. 13 is the recessed position of the surface 192 provided by the curved projecting portion 196 included in the design of the wheel-securing clip 30. The curved projecting portion 196 is embodied as a curved portion 200 in the present example. The curved portion 200 defined in the wheel-securing clip 30 locate the surface 192 deeper so that the overmolding material 22 can meet the curved portion 200 in a way to produce an efficient junction. This can be better understood by comparing a wheel-securing clip 30 having no curved projecting portion 196, in FIG. 14, and the wheel-securing clip 30 of FIG. 13 illustrated from the side in FIG. 15. One can appreciate that the curved portion 200 provides a junction area 204 adapted to abut the overmolding material 22 that is schematically represented in FIG. 15. The junction area 204 created by the curved portion 200 defined in the curved projecting portion 196 is adapted to abut the overmolding material 22. The curved portion 200 can be used as an extension of the mold and is used to further define the volume defined by the mold. The curved portion 200 provides a more "radial" junction surface with the overmolding material 22. This prevents having a very thin layer of overmolding material 22 joining the wheel-securing clip 30 that could easily wave or curve and leaves an opening for dirt and water to enter between the overmolding material 22 and the wheel-securing clip 30. In some embodiments, the desired thickness 208 of overmolding material 22 over the surrounding surface 192 can dictate the height of the curved portion 200 therefore many different designs are possible to serve different needs. A second junction area 212 is provided on the opposite side and preferably provides a surface that can substantially radially abuts the overmolding material 22. As it can be appreciated, a whole portion 216 of the wheel-securing clip 30 is used to contain the overmolding material 22.

Figure 19:
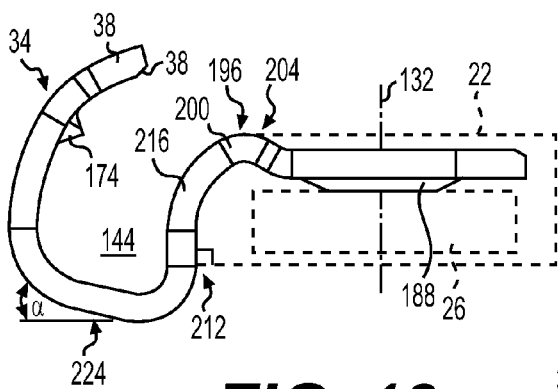
FIG. 19 is a transversal sectional elevational view of a wheel-securing clip in accordance with at least one embodiment of the invention.
Figure 20:
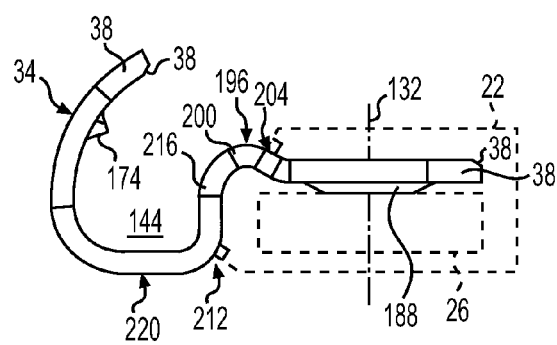
FIG. 20 is a transversal sectional elevational view of a wheel-securing clip in accordance with at least one embodiment of the invention.
Figure 21:
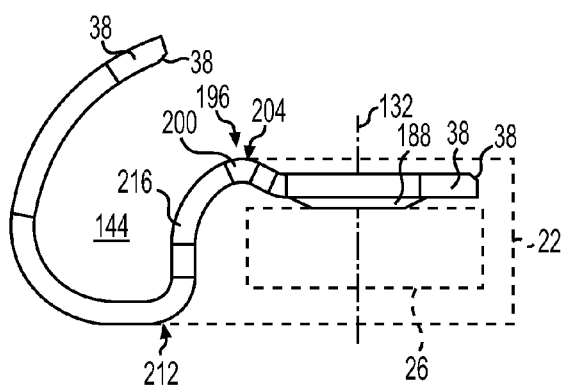
FIG. 21 is a transversal sectional elevational view of a wheel-securing clip in accordance with at least one embodiment of the invention.
Figure 24:
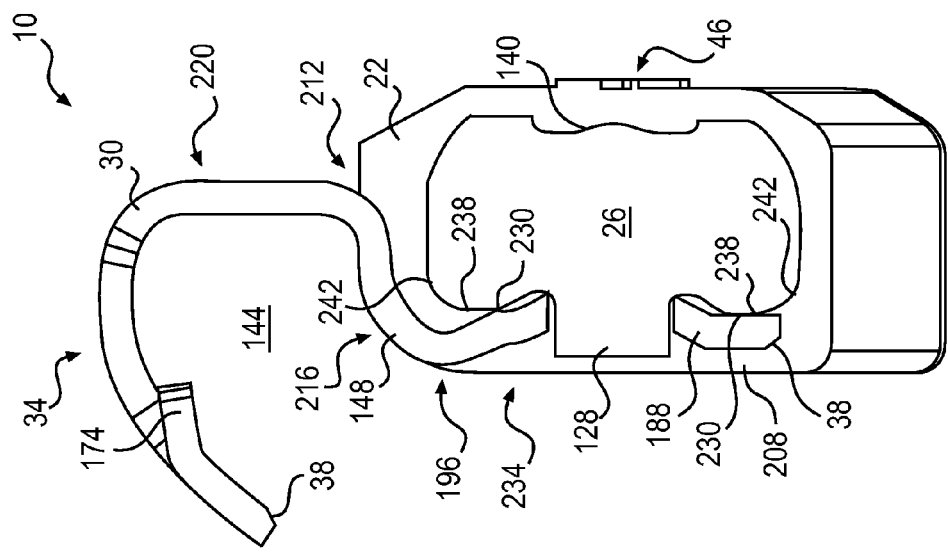
FIG. 24 is a transversal sectional elevational view of a wheel-securing clip and a weight of an overmolded wheel-balancing weight in accordance with at least one embodiment of the invention.
Figure 23:
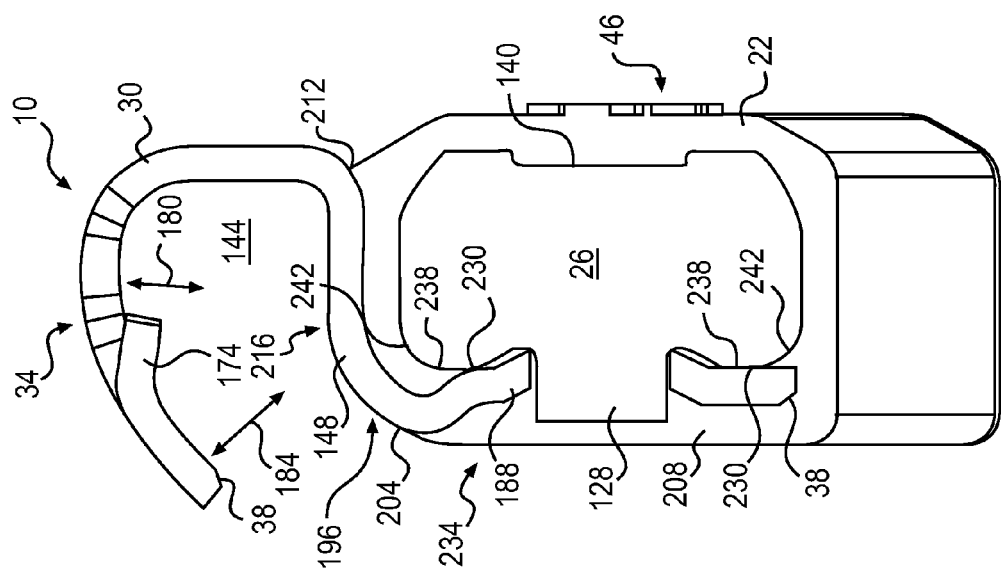
FIG. 23 is a transversal sectional elevational view of a wheel-securing clip and a weight of an overmolded wheel-balancing weight in accordance with at least one embodiment of the invention.

FIG. 16 through FIG. 21 illustrate a series of embodiments including wheel-securing clips 30 having different shapes adapted to be secured to different shape of wheels and adapted to cooperate with various metallic weights 26. For example, the embodiments illustrated in FIG. 13, FIG. 15, FIG. 17, FIG. 18 and FIG. 20 respectively have a flat clip portion 220. FIG. 19 illustrates an embodiment including an angled flat clip portion 224.

Figure 22:
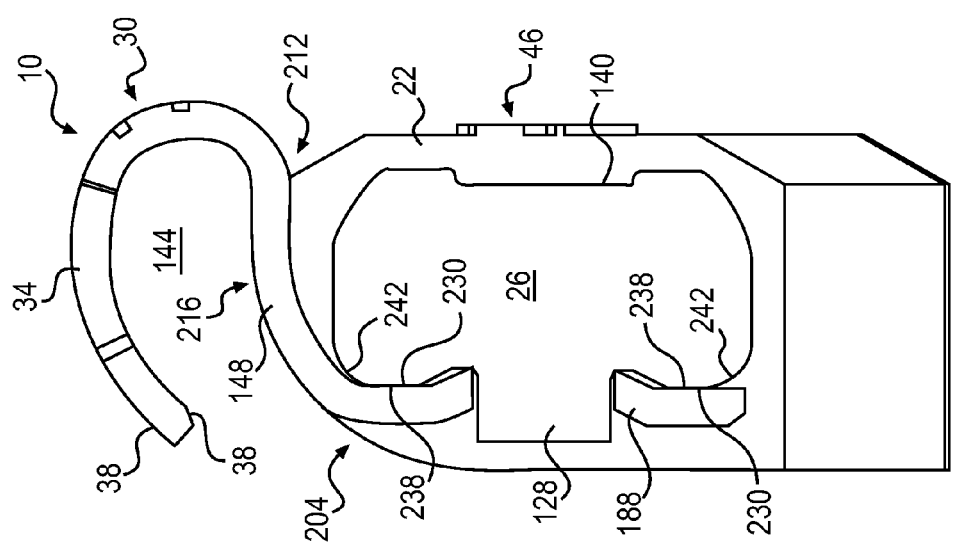
FIG. 22 is a transversal sectional elevational view of a wheel-securing clip and a weight of an overmolded wheel-balancing weight in accordance with at least one embodiment of the invention.
Figure 27:
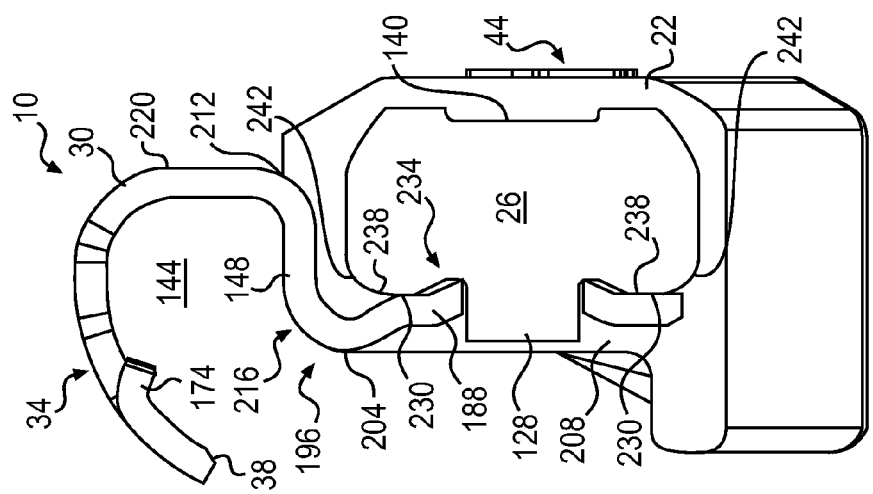
FIG. 27 is a transversal sectional elevational view of a wheel-securing clip and a weight of an overmolded wheel-balancing weight in accordance with at least one embodiment of the invention.
Figure 26:
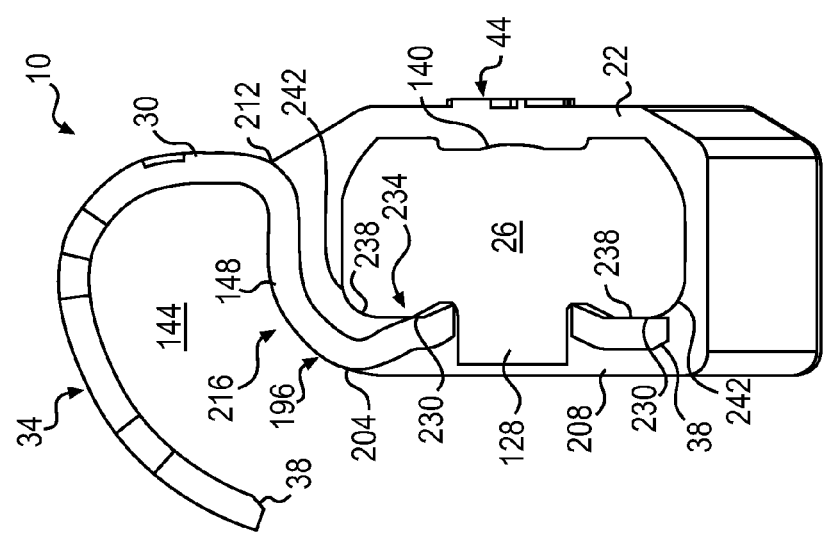
FIG. 26 is a transversal sectional elevational view of a wheel-securing clip and a weight of an overmolded wheel-balancing weight in accordance with at least one embodiment of the invention.
Figure 25:
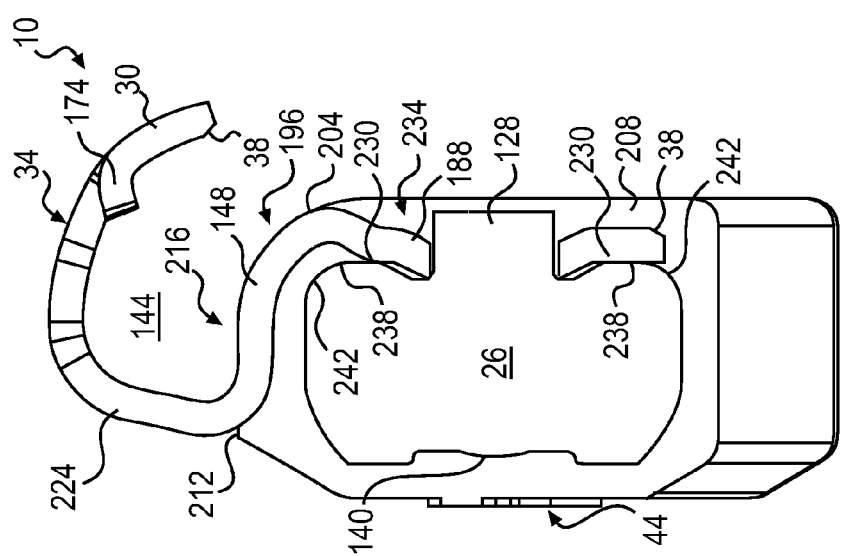
FIG. 25 is a transversal sectional elevational view of a wheel-securing clip and a weight of an overmolded wheel-balancing weight in accordance with at least one embodiment of the invention.

Turning now to FIG. 22 through FIG. 25 illustrating a series of sectional embodied wheel-balancing weights 10. In these embodiments the steel weight 26 is assembled to the wheel-securing clip 30 but the fastening protrusion 128 is not shown compressed. From these embodiments one can appreciate the distribution of the overmolding material 22 over the steel weight 26. The contact locations 230 between the steel weight 26 and the wheel-securing clip 30 is clearly shown for each embodiment. FIG. 22 illustrate en embodiment corresponding to the wheel-securing clip 30 of FIG. 14 that does not include a curved projecting portion 196. The embodiments shown in FIG. 15 through FIG. 27 include the curved projecting portion 196 that allows an additional thickness 208 of overmolding material 22. It can be appreciated from FIG. 23 through FIG. 27 that the combination of the curved projecting portion 196 and the recessed portion 188 of the wheel-securing clip 30 create a sequence of three combined curves 234 (or combined angled portions). A portion of a stamping 46, or a shape/letters/information, defined in the overmolding material 22 can also be seen in these figures.

Referring to FIG. 22, the steel weight 26 is provided with flat, or planar, contact portions 238 adapted to provide a suitable contact interface with the wheel-securing clip 30. Radiuses 242 are provided on the metallic weights 26 to substantially match the curvature of the clip 148 in some embodiments and also provide a space where overmolding material 22 can be injected between the wheel-securing clip 30 and the metallic-weight 26.

Figure 30:
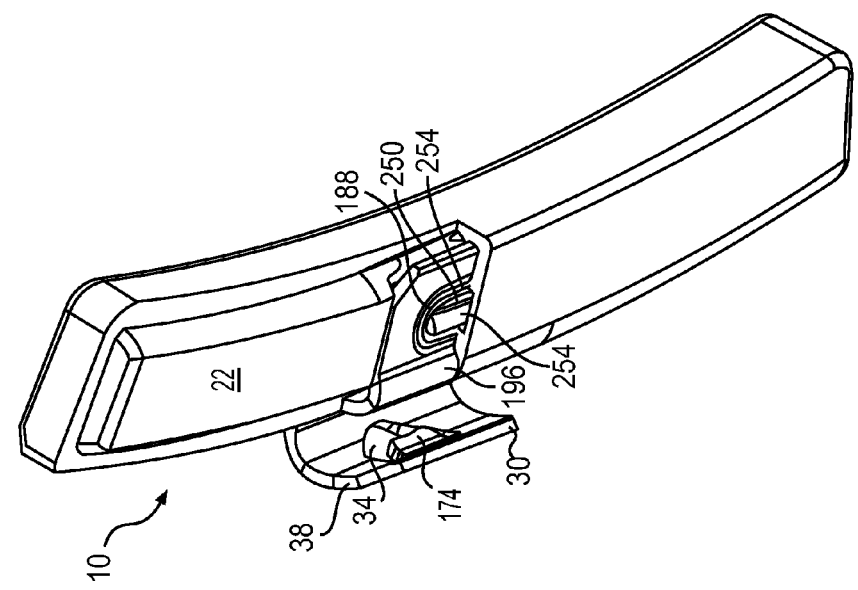
FIG. 30 is an isometric view of a wheel-securing clip and a weight of an overmolded wheel-balancing weight in accordance with at least one embodiment of the invention.
Figure 29:
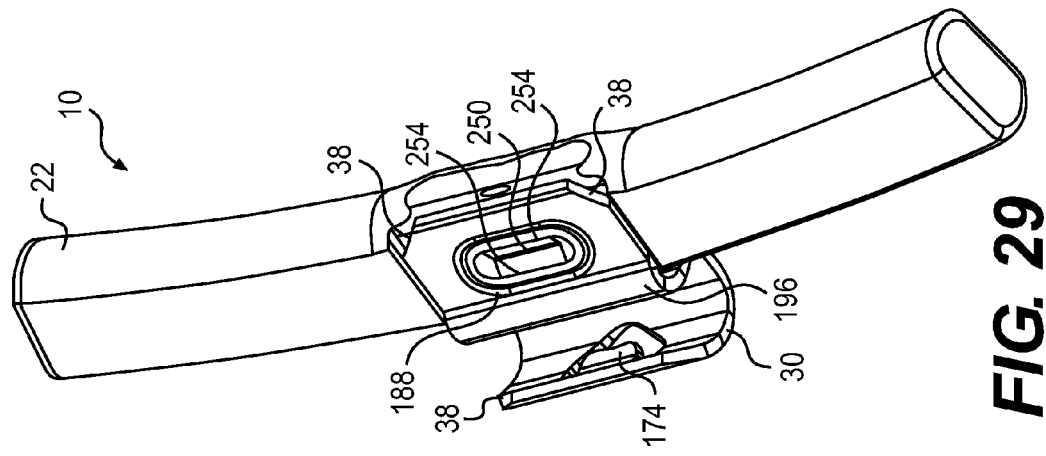
FIG. 29 is an isometric view of a wheel-securing clip and a weight of an overmolded wheel-balancing weight in accordance with at least one embodiment of the invention.
Figure 28:
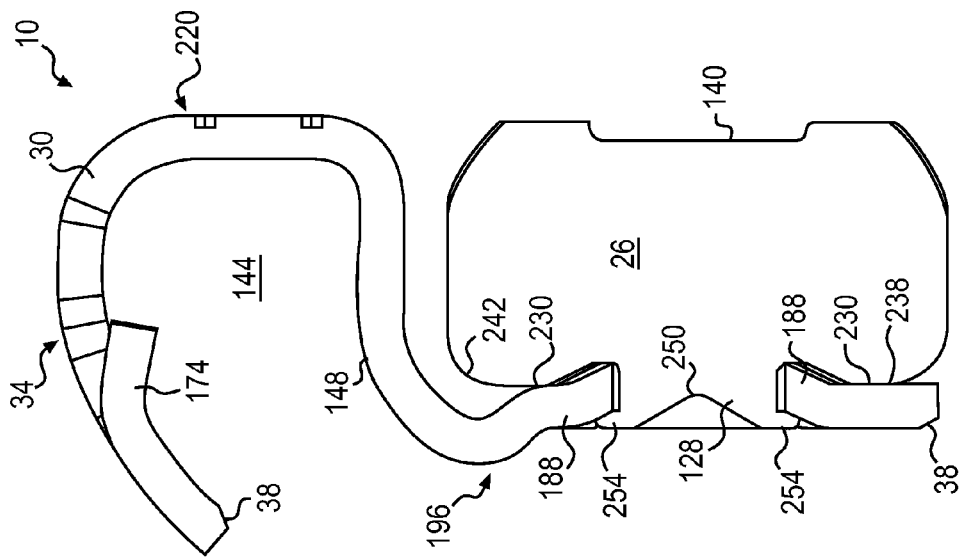
FIG. 28 is a transversal sectional elevational view of a wheel-securing clip and a weight of an overmolded wheel-balancing weight in accordance with at least one embodiment of the invention.

The wheel-securing clip 30 is secured to the steel weight 26 via the interface provided between the fastening protrusion 128 engagement with the opening 132 provided in the wheel-securing clip 30. The fastening protrusion 128 is compressed 250 to protrude and extend 254 over the recessed portion 188 of the wheel-securing clip 30 as it can be appreciated in FIG. 28, FIG. 29 and FIG. 30. This assembly ensures that the wheel-securing clip 30 is permanently secured to the steel weight 26 to create a unitary wheel-balancing weight 10.

Figure 31:
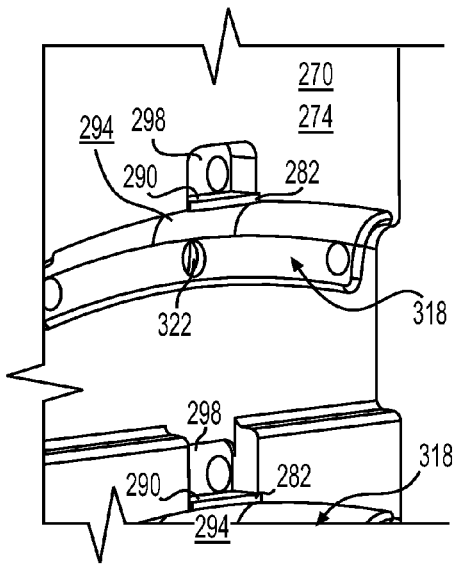
FIG. 31 is an isometric view of a portion of an injection mold in accordance with at least one embodiment of the invention.
Figure 32:
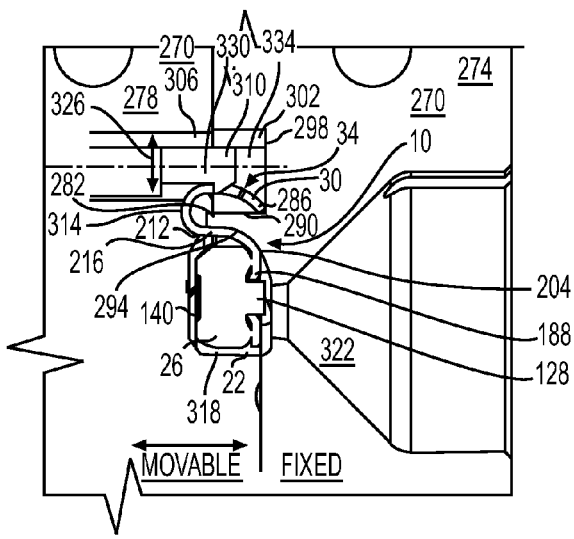
FIG. 32 is a side elevation view of a portion of an injection mold in accordance with at least one embodiment of the invention.

The overmolded-wheel balancing weight 10 of embodiments of the invention is manufactured with an injection process. The injection process uses a mold 270 including a fixed portion 274 and a movable portion 278 that can be appreciated in FIG. 31 through FIG. 33. The wheel-securing clip 30 and steel weight 26 assembly is positioned in the mold 270 prior to injecting the polymer in the mold 270. The wheel-securing clip 30 and steel weight 26 assembly is located in the mold 270 by hooking the wheel-securing clip 30 to a clip supporting member 282 when the mold 270 is open. The wheel-securing clip 30 is preferably self-positioned by contacting the clip supporting member 282 at a plurality of locations. In the embodiment exemplified in FIG. 32, the end 286 of the wheel-securing clip 30 contacts the upper side 290 of the clip supporting member 282 while a lower portion 216 of the wheel-securing clip 30 contacts the lower side 294 of the clip supporting member 282. Further, the end 286 of the wheel-securing clip 30 is contacting a vertical edge 298 of the mold 270 to ensure not lateral movement is allowed. The clip-supporting member 282 of the illustrated embodiment is defined in the fixed portion 274 of the mold 270 with a clip-receiving cavity 302 included in the mold 270. The clip-receiving cavity 302 is prolonging a clip-retaining member cavity 306 in the movable portion 278 of the mold 270 from which extends a movable clip-retaining member 310 that will be discussed below in details.

The wheel-securing clip 30 is temporarily secured in the mold 270 when the movable portion 278 of the mold 270 is closed onto the fixed portion 274 by applying a pressure on the wheel-securing clip 30 with a clip mating edge 314. With that configuration, the wheel-securing clip 30 and steel weight 26 assembly is positioned such that the wheel-securing clip 30 is firmly secured in the closed mold 270 and the steel weight 26 is suspended in the injection cavity 318 of the mold 270. Injection of the overmolded material is preferably made symmetrically in the injection cavity 318. In the illustrated embodiment, the injection is made through a central injection port 322 to ensure equal distribution of the injection material 22 in the injection cavity 318. Alternatively, the injection could be made by a plurality of injection ports (not illustrated) that would also equally distribute the injection material 22 in the injection cavity 318. The steel weight 26 can be preheated prior to be placed in the injection cavity 318 to help prevent expedited solidification of the injection material 22 by cooling too fast the injection material 22 in the mold 270 such that the injection material 22 doesn't have time to fill completely the injection cavity 318 before solidification. Another way to help prevent early solidification of the injection material 22 is to preheat the injection material 22 in the circuit bringing the injection material 22 in the mold 270 to increase the time before the injection material 22 begins solidification. Positioning stems 338 (visible in FIG. 33) are provided in the mold 270 to help locate properly the steel weight 26 in the injection cavity 318. These positioning stems 338 are adapted to be axially movable for contacting the metallic weight 22 when the mold 270 is closed and ensure proper positioning of the metallic weight 22. The positioning stems 338 are adapted to be retracted as some point during the injection process when the overmolding material 22 begins to flow in the injection cavity 318. The positioning stems 338 becomes optional when the overmolding material 22 is injected in the injection cavity 318 because the overmolding material 22 stabilizes the steel weight 26 in the injection cavity 318. The injection of the overmolding material 22 is completed when the positioning stems 338 are retracted to ensure an even finish of the overmolding material 22. The stems 338 are extended again, in an embodiment of the invention, when the mold 270 opens to stabilize and eject the overmolded wheel-balancing weight 10 from the mold 270.

The movable clip-retaining member 310 is engaging the hole 34 included on the upper side of the wheel-securing clip 30 when the mold 270 is closing. The movable clip-retaining member 310 extends from the clip-retaining cavity 306 in the movable portion 278 of the mold 270. The clip-retaining cavity 306 is sized and designed to allow sufficient vertical movements 326 to allow engagement of the hook 330 with the hole 34. A corresponding opening 334 is included in the fixed portion 274 of the mold 270. The corresponding opening 334 is configured to receive therein the movable clip-retaining member 310 and also to push the movable clip-retaining member 310 downward so that the hook 330 engages in the hole 34 of the wheel-securing clip 30 and cannot disengage when the mold 270 is closed. The movable clip-retaining member 310 is used to pull the overmolded wheel-balancing weight 10 from the fixed portion 274 of the mold 270 as it can be seen in FIG. 33. Once the overmolded wheel-balancing weight 10 pulled from the fixed portion 274 of the mold 270 the movable clip-retaining member 310 is moved upward to disengage the movable clip-retaining member 310 from the hole 34 of the wheel-securing clip 30.

Figure 33:
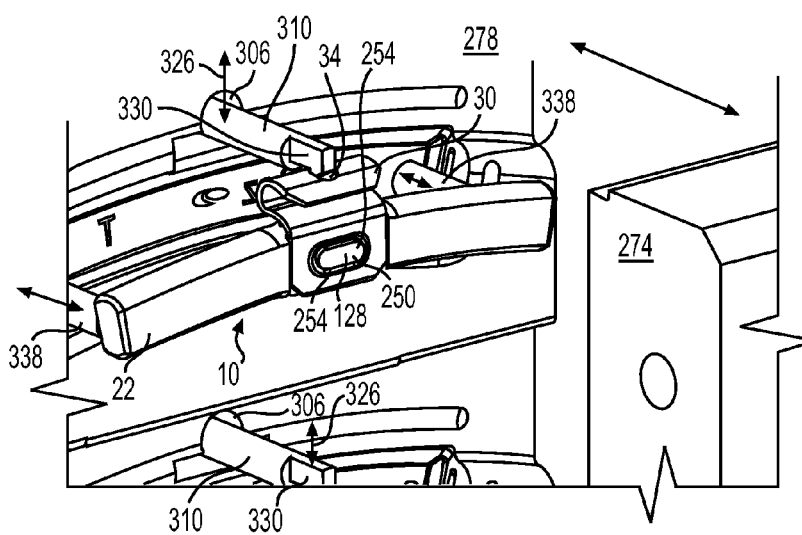
FIG. 33 is an isometric view of a portion of an injection mold in accordance with at least one embodiment of the invention.

Referring now more precisely to FIG. 33, the illustrated overmolded wheel-balancing weight 10 has no overmolding material 22 in the neighborhood of the wheel-securing clip 30 to better see the assembled overmolded wheel-balancing weight 10 and also to illustrate one embodiment of the invention. In contrast, the junction of the wheel-securing clip 30 with the steel weight 26 is covered in other embodiments discussed above.

Figure 34:
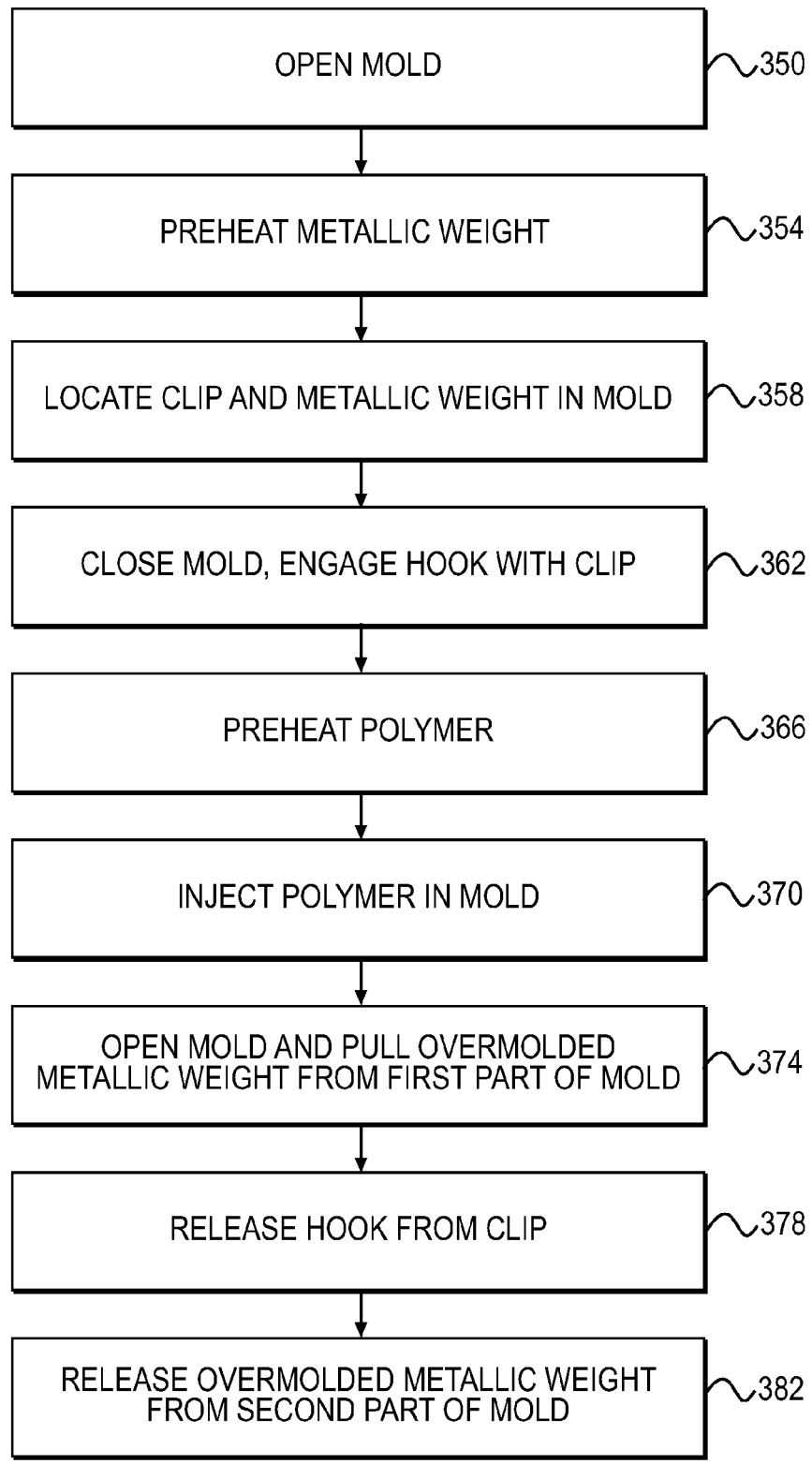
FIG. 34 is an illustrative flow chart of an exemplary series of steps in accordance with at least one embodiment of the invention.

FIG. 34 illustrates an exemplary sequence of steps that can be used to overmold a wheel-balancing weight 10. The mold 270 opens 350, the steel weight 26 is heated 354 to prevent early solidification of the overmolding material 22, The wheel-securing clip 30 is secured 358 in the mold 270, the mold is closed 362 and the wheel-securing clip 30 is secured in the mold 270, the polymer, or the overmolding material, is heated 366 prior to be injected in the mold 270, the polymer is injected 370 in the mold 270 and solidifies, the mold 270 opens 374 to extract the overmolded wheel-balancing weight 10 therefrom 374, the hook 330 from the movable clip-retaining member 310 is released 378 from the wheel-securing clip 30 and finally the overmolded wheel-balancing weight 10 is released 382 from the mold 270.

Figure 35:
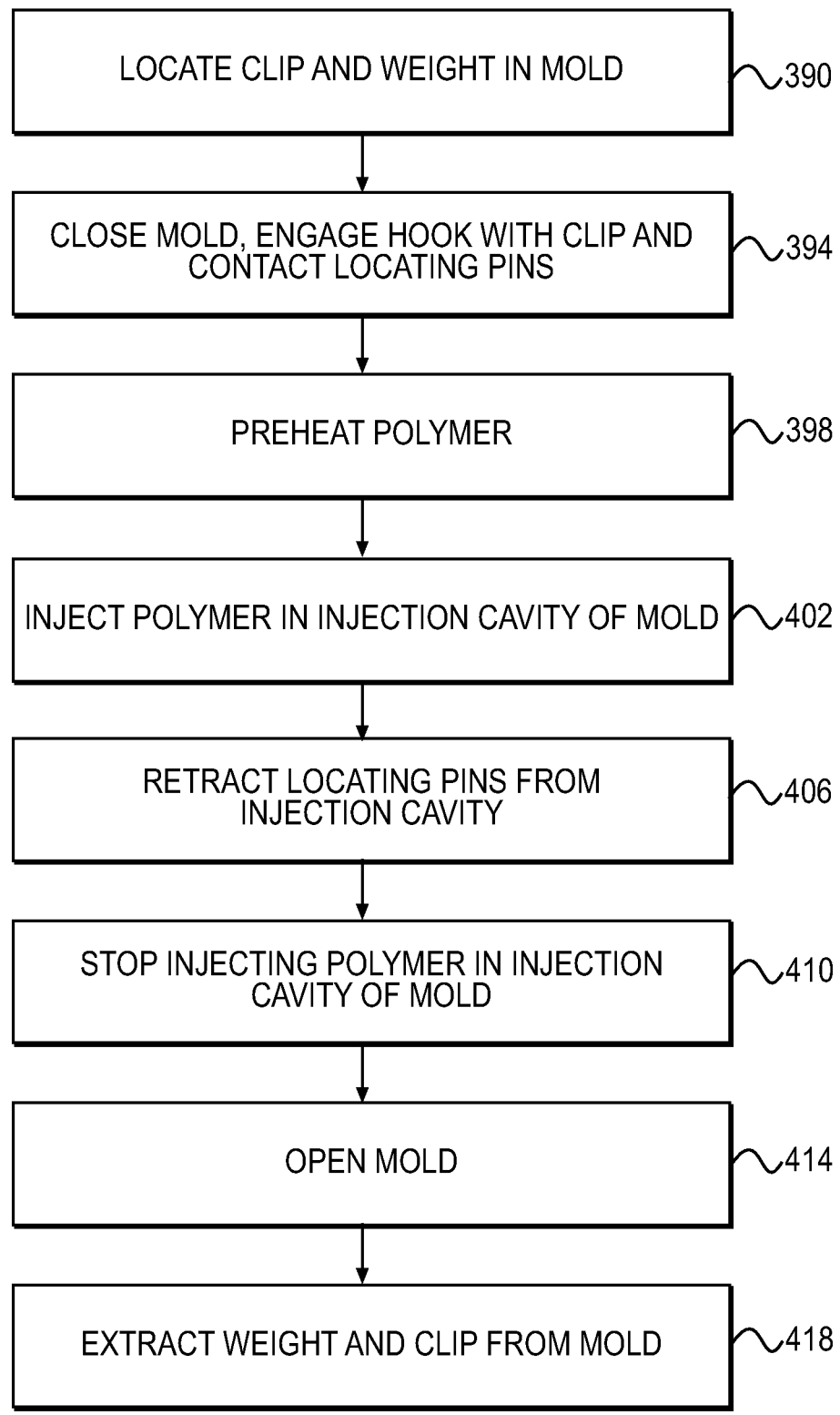
FIG. 35 is an illustrative flow chart of an exemplary series of steps in accordance with at least one embodiment of the invention.

Similarly, FIG. 35 illustrates another alternate sequence of steps adapted to embody embodiments of the invention. The wheel-securing clip 30 is used to locate 390 the unmolded steel weight 26 in the mold 270, The mold 270 is closed and the hook 330 engages 394 the wheel-securing clip 30, the overmolding material is heated 398 prior to being injected in the mold 270, the overmolding material 22 is injected in the mold's injection cavity 318, the locating stems 338 are retracted 406 during injection of the overmolding material 22 in the injection cavity 318, the injection stops 410, the mold 270 opens 414 and the overmolded wheel-balancing weight 10 is extracted 418 from the mold 270.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An overmolded wheel-balancing weight comprising:
   a wheel-securing clip adapted to be secured to a wheel, the wheel-securing clip comprising
      a wheel-securing portion at a first end thereof;
      a weight securing portion at a second end thereof, the wheel-securing portion comprising a cavity on a first side thereof adapted to receive therein a portion of the wheel to secure the wheel-balancing weight to the wheel, and a second side thereof, opposed to the cavity on the first side;
      a projecting portion, distally extending on the first side, in an offset manner with respect to the weight-securing portion, located between the wheel-securing portion and the weight-securing portion,
      a weight secured to the weight securing portion on the second side of the wheel-securing clip; and
      overmolding polymer covering the weight-securing portion and extending on the first side thereof in a radial direction toward the cavity to the projecting portion, the overmolding polymer abutting the projecting portion with a shape generally following a shape of the projecting portion that is uncovered by the overmolding material,
   wherein the cavity of the wheel-securing portion is sized and designed to engage and secure a portion of the wheel on a basis of an elastic deformation of the wheel-securing portion, the elastic deformation of the wheel-securing portion providing a pinching force against the portion of the wheel to mechanically secure the overmolded wheel-balancing weight to the wheel,
   wherein the overmolding polymer tangentially abutting the projecting portion is adapted to be compressed by the elastic deformation of the wheel-securing portion when engaging the portion of the wheel to prevent creating or increasing a gap between the overmolding material and the wheel-securing clip to avoid introducing foreign material between the overmolding material and the wheel-securing clip.

2. The overmolded wheel-balancing weight of claim 1, wherein the weight includes steel material.

3. The overmolded wheel-balancing weight of claim 1, wherein the overmolding polymer material abuts substantially tangentially the wheel-securing clip.

4. The overmolded wheel-balancing weight of claim 1, wherein the shape of the projecting portion includes a radius thereof and the overmolding polymer material generally follows a projection of the radius.

5. The overmolded wheel-balancing weight of claim 1, wherein the wheel-securing clip is a boundary for the overmolding material when the overmolding material is injected in an injection mold.

6. The overmolded wheel-balancing weight of claim 1, wherein the cavity is substantially free of overmolding polymer material.

7. The overmolded wheel-balancing weight of claim 1, wherein the wheel-securing clip includes an opening therein for receiving and securing the weight.

8. The overmolded wheel-balancing weight of claim 1, wherein the polymer includes one of polyethylene and polypropylene.

9. A wheel with an overmolded wheel-balancing weight comprising removably secured to the wheel to reduce undesired vibrations when the wheel is rotating, the overmolded wheel-balancing weight comprising:
   a wheel-securing clip adapted to be secured to the wheel, the wheel-securing clip comprising
      a wheel-securing portion at a first end thereof;
      a weight securing portion at a second end thereof, the wheel-securing portion comprising a cavity on a first side thereof adapted to receive therein a portion of the wheel to secure the wheel-balancing weight to the wheel, and a second side thereof, opposed to the cavity on the first side;
      a projection portion, distally extending on the first side, in an offset manner with respect to the weight-securing portion, located between the wheel-securing portion and the weight-securing portion,
      a weight secured to the weight securing portion on the second side of the wheel-securing clip; and
      overmolding polymer covering the weight-securing potion and extending on the first side thereof in a radial direction toward the cavity to the projecting portion, the overmolding polymer abutting the projecting portion with a shape generally following a shape of the projecting portion that is uncovered by the overmolding material,
   wherein the cavity of the wheel-securing portion is sized and designed to engage and secure a portion of the wheel on a basis of an elastic deformation of the wheel-securing portion, the elastic deformation of the wheel-securing portion providing a pinching force against the portion of the wheel to mechanically secure the overmolded wheel-balancing weight to the wheel,
   wherein the overmolding polymer tangentially abutting the projecting portion is adapted to be compressed by the elastic deformation of the wheel-securing portion when engaging the portion of the wheel to prevent creating or increasing a gap between the overmolding material and the wheel-securing clip to avoid introducing foreign material between the overmolding material and the wheel-securing clip.

10. The wheel of claim 9, wherein the weight includes steel material.

11. The wheel of claim 9, wherein the wheel-securing clip is a boundary for the overmolding material when the overmolding material is injected in an injection mold.

12. The wheel of claim 9, wherein the cavity is substantially free of overmolding polymer material.

13. The wheel of claim 9, wherein the wheel-securing clip includes an opening therein for receiving and securing the weight.

14. The wheel of claim 9, wherein the polymer includes one of polyethylene and polypropylene.

15. A vehicle equipped with at least one wheel including at least one overmolded wheel-balancing weight removably secured to the wheel to reduce undesired vibrations when the vehicle moves and the at least one wheel is rotating, the overmolded wheel-balancing weight comprising:
 a wheel-securing clip adapted to be secured to the wheel, the wheel-securing clip comprising
  a wheel-securing portion at a first end thereof;
  a weight securing portion at a second end thereof, the wheel-securing portion comprising a cavity on a first side thereof adapted to receive therein a portion of the wheel to secure the wheel-balancing weight to the wheel, and a second side thereof, opposed to the cavity on the first side;
  a projecting portion, distally extending on the first side, in an offset manner with respect to the weight-securing portion, located between the wheel-securing portion and the weight-securing portion,
  a weight secured to the weight securing portion on the second side of the wheel-securing clip; and
  overmolding polymer covering the weight-securing portion and extending on the first side thereof in a radial direction toward the cavity to the projecting portion, the overmolding polymer abutting the projecting portion with a shape generally following a shape of the projecting portion that is uncovered by the overmolding material,
 wherein the cavity of the wheel-securing portion is sized and designed to engage and secure a portion of the wheel on a basis of an elastic deformation of the wheel-securing portion, the elastic deformation of the wheel-securing portion providing a pinching force against the portion of the wheel to mechanically secure the overmolded wheel-balancing weight to the wheel,
 wherein the overmolding polymer tangentially abutting the projecting portion is adapted to be compressed by the elastic deformation of the wheel-securing portion when engaging the portion of the wheel to prevent creating or increasing a gap between the overmolding material and the wheel-securing clip to avoid introducing foreign material between the overmolding material and the wheel-securing clip.

16. The vehicle of claim 15, wherein the weight includes steel material.

17. The vehicle of claim 15, wherein the wheel-securing clip is a boundary for the overmolding material when the overmolding material is injected in an injection mold.

18. The vehicle of claim 15, wherein the cavity is substantially free of overmolding polymer material.

19. The vehicle of claim 15, wherein the wheel-securing clip includes an opening therein for receiving and securing the weight.

20. The vehicle of claim 15, wherein the polymer includes one of polyethylene and polypropylene.

* * * * *